(12) United States Patent
Schaller et al.

(10) Patent No.: US 7,877,982 B2
(45) Date of Patent: Feb. 1, 2011

(54) DEVICE AND METHOD FOR AFTERTREATING EXHAUST GASES

(75) Inventors: Johannes Schaller, Leonberg (DE); Georg Weber, Brackenheim-Stock (DE); Horst Harndorf, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1892 days.

(21) Appl. No.: 10/181,696

(22) PCT Filed: Nov. 24, 2001

(86) PCT No.: PCT/DE01/04433

§ 371 (c)(1), (2), (4) Date: Jul. 14, 2003

(87) PCT Pub. No.: WO02/43840

PCT Pub. Date: Jun. 6, 2002

(65) Prior Publication Data

US 2005/0247048 A1    Nov. 10, 2005

(30) Foreign Application Priority Data

Nov. 30, 2000   (DE) .................................. 100 59 427

(51) Int. Cl.
*F01N 3/00*   (2006.01)

(52) U.S. Cl. ............................. 60/286; 60/274; 60/295; 60/297; 60/303

(58) Field of Classification Search ................... 60/274, 60/286, 295, 297, 301, 303
See application file for complete search history.

(56) References Cited

U.S. PATENT DOCUMENTS

| | | | | |
|---|---|---|---|---|
| 4,134,262 A * | 1/1979 | Sugihara et al. | ............... | 60/289 |
| 5,570,576 A * | 11/1996 | Ament et al. | ................ | 60/300 |
| 5,771,689 A * | 6/1998 | Bareis et al. | .................. | 60/286 |
| 5,806,310 A * | 9/1998 | Daidou et al. | ................. | 60/286 |
| 5,960,627 A * | 10/1999 | Krampe et al. | ................ | 60/274 |
| 6,079,203 A * | 6/2000 | Wakamoto | .................... | 60/274 |
| 6,122,909 A * | 9/2000 | Murphy et al. | ................ | 60/286 |
| 6,209,315 B1 * | 4/2001 | Weigl | .......................... | 60/274 |
| 6,273,120 B1 * | 8/2001 | Hofmann et al. | ............. | 137/98 |
| 6,470,673 B1 * | 10/2002 | van Nieuwstadt et al. | ..... | 60/274 |
| 6,508,057 B1 * | 1/2003 | Bouchez et al. | ............... | 60/286 |
| 6,810,661 B2 * | 11/2004 | Lambert et al. | .............. | 60/286 |
| 6,834,496 B2 * | 12/2004 | Nakatani et al. | ............. | 60/274 |

* cited by examiner

*Primary Examiner*—Tu M Nguyen
(74) *Attorney, Agent, or Firm*—Ronald E. Greigg

(57) ABSTRACT

A device and method for aftertreating exhaust gases in which a controllable valve is used to introduce a supplementary agent in fluid form into the exhaust system at high pressures. The high-pressure promotes an efficient mixture of the supplementary agent for the aftertreatment with the exhaust gas emerging from the internal combustion engine.

4 Claims, 1 Drawing Sheet

DEVICE AND METHOD FOR AFTERTREATING EXHAUST GASES

CROSS-REFERENCE TO RELATED APPLICATIONS

This application is a 35 U.S.C. 371 application of PCT/DE 01/04433, filed on Nov. 24, 2001.

BACKGROUND OF THE INVENTION

1. Field of the Invention

The invention is based on a device and method for aftertreating exhaust gases of an internal combustion engine.

2. Description of the Prior Art

A device and method of the type with which this invention is concerned have been disclosed by German Patent Application serial number 44 36 415.6, in which a supplementary agent used for the aftertreatment is supplied to the exhaust system in a vaporized form. A vaporizing unit used for this can only have a limited heating capacity so that at high speeds of the engine, difficulties can arise in supplying a sufficient quantity of the supplementary agent.

SUMMARY OF THE INVENTION

The device and method according to the invention have the advantage over the prior art of assuring that the admixture of the supplementary agent for aftertreating the exhaust gas is sufficient in every operating state. The admixture of the supplementary agent in fluid form and the atomization by means of an appropriate admission pressure assures an efficient mixture of supplementary agent and the exhaust gas. The finely diffused droplets of the supplementary agent being produced evaporate due to the influence of the heat from the surrounding exhaust gas. The turbulence in the exhaust gas, which is further intensified by the injection process, provides for a good mixture of the fuel vapor with the exhaust gas.

It is particularly advantageous to supply the supplementary agent in the form of fuel by means of a common rail system of the engine, which system is already used to inject the fuel into the combustion chamber. Particularly in diesel motors that use common rail injection technology, the pressure required for an efficient atomization can be taken at any time from the distributor rail of the common rail system.

It is also advantageous to use an already known subassembly, a common rail injector, as the injection device, of the kind also used for fuel injection in the engine block.

The supplementary agent is advantageously used for periodically executed regeneration of a reservoir catalytic converter, which is used to reduce nitrogen oxides present in the exhaust gas. Alternative to or in combination with the use for this reduction, an injection can also advantageously be provided to promote the combustion of soot particles. The injection can advantageously heat the exhaust gas through oxidation of fuel in a catalytic material by means of a catalytic burner.

BRIEF DESCRIPTION OF THE DRAWINGS

Exemplary embodiments of the invention are shown in the drawing and will be explained in detail in the subsequent description.

The sole FIGURE shows a high-pressure device connected to a catalytic converter apparatus by means of an injection device.

DESCRIPTION OF THE PREFERRED EMBODIMENTS

Figure 1:
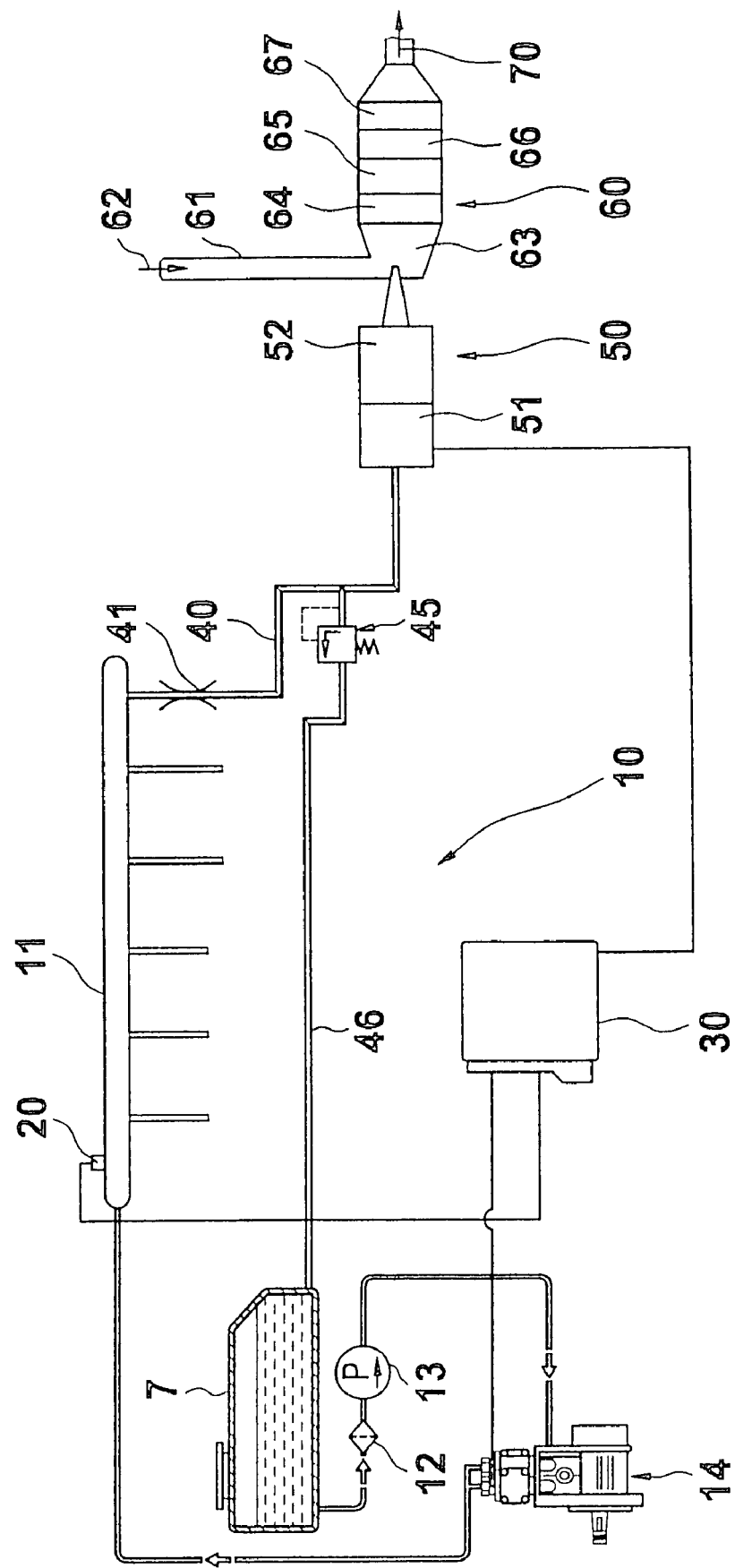

FIG. 1 shows a high-pressure device embodied as a common rail system 10. A fuel filter 12 and a presupply pump 13 connect a fuel tank 7 to a high-pressure pump 14, which leads to a distributor rail 11. A pressure sensor 20 attached to the distributor rail 11 is connected by means of an electrical line to a control unit 30, which controls the high-pressure pump 14. A fuel line 40 leads through a throttle 41 to an electrically controllable solenoid valve 51. By means of a pressure controller 45, the fuel line 40 is connected to the fuel tank 7 via a return line 46. The solenoid valve 51 is part of the injection device 50, which has a nozzle device 52 disposed downstream of the solenoid valve 51. The nozzle device 52 protrudes with its nozzle opening into the inlet region 63 of a catalytic converter apparatus 60. Exhaust gas 62 from the motor can be introduced into the catalytic converter by means of a supply line 61 leading to the inlet region 63. Downstream of the inlet region 63, the catalytic converter apparatus has an oxidation catalytic converter 64, followed by a reservoir catalytic converter 65, and an additional oxidation catalytic converter 66. The oxidation catalytic converter 66 is followed by a sound absorber 67. The treated exhaust gas emerging from the catalytic converter apparatus 60 is symbolically depicted with the reference numeral 70.

The principal design of a common rail injection system with a distributor rail 11 is already known in and of itself. A presupply pump, which is situated in the vicinity of a fuel tank 7, feeds from the fuel tank to a high-pressure pump 14, which is disposed in the engine compartment of the vehicle. The high-pressure pump 14 supplies the required high pressures in a range from 100 to 2000 bar, preferably in a range between 300 and 2,000 bar, particularly in a range between 1350 bar and 1650 bar. The distributor rail 11 consequently represents a high-pressure reservoir of fuel, which can be used by the common rail injectors that are connected to it and that inject the fuel into the combustion chambers of the engine block. The common rail injectors are not explicitly shown; only five fuel lines leading to such common rail injectors are depicted, via which the fuel is conveyed from the distributor rail 11 to the common rail injectors. The use of common rail injectors to supply fuel into the engine block is known and is described, for example, in DE 195 35 162. The pressure sensor 20 monitors the fuel pressure in the distributor rail 11 and supplies this information to the control unit 30, which appropriately controls the high-pressure pump 14 in order to assure a particular pressure in the distributor rail. In addition to the electrical signals of the pressure sensor 20, the control unit 30 processes the signals of other sensors that are not shown in the drawing, for example sensors that detect temperature, pressure, soot, NOx, fuel, and/or NH3. In addition to the fuel lines leading to the common rail injectors mounted on the engine block, the invention also proposes providing an additional withdrawal line 40, which leads to the catalytic converter apparatus via a throttle 41 and a solenoid valve 51, in order to use the constantly high pressure of the distributor rail 11, which is for injecting fluid fuel into the exhaust system, to enrich the exhaust gas. The throttle 41 limits the through flow. The pressure controller 45 is used to control the pressure in the line 40 and in the event of excessive pressure levels, can convey fuel back to the fuel tank 7 via the return line 46. The control unit 30 controls the solenoid valve 51 in the same way as the high-pressure pump 14, thus permitting the nozzle device 52 to inject fluid fuel in a finely atomized form into the inlet region 63 of the catalytic converter apparatus 60 in a definite manner. The supply of fuel into the exhaust flow here takes place at a pressure of 100 to 2000 bar, in particular at a pressure of 100 to 600 bar. The pressure range from 100 to 600 bar is preferable to greater values in order to prevent the injection device 50 from having a noticeable effect on the common rail system and the motor injection. The solenoid valve 51 executes the metering function in the current device for aftertreating exhaust gas. The fuel mixes with the incoming exhaust gas 62 and travels into the oxidation catalytic converter 64 and then into the reservoir catalytic converter 65, in which the nitrogen oxides of the exhaust gas are reduced. The treated exhaust gas 70 travels through a subsequent oxidation catalytic converter 66, the sound absorber 67, and an exhaust tail pipe into the surrounding air.

In an alternative embodiment, the controllable solenoid valve 51 and the nozzle device 52 can be integrated into an injection device 50 embodied as a common rail injector of the kind usually used to inject fuel into the engine block in common rail systems. In this instance, a pressure controller is already integrated into the common rail injector so that the fuel line 46 is connected directly to the corresponding outlet of the common rail injector. It is then possible to also eliminate the inlet throttle 41 since it is already integrated into conventional common rail injectors so that the injection device 50 embodied as a common rail injector is connected to the distributor rail 11 in the same way as common rail injectors installed in the engine block. In another alternative embodiment, a device for damping pressure fluctuations can be provided, which is disposed in the line 40 between the distributor rail 11 and the throttle 41 or between the throttle and the solenoid valve 51. Alternatively to being controlled by the control unit 30, the solenoid valve 51 and injection device 50 can also be operated by a separate control unit, which is responsible for only the aftertreatment of exhaust gas. An injection device 50 connected to a high-pressure device, in particular a common rail system 10, can be used in a similar way, even with other catalytic converters, in particular with active NOx-removing catalytic converters and/or SCR catalytic converters (SCR=Selective Catalytic Reduction), for the metered addition of fluid fuel.

In another alternative embodiment, the catalytic converter apparatus can also have a soot filter connected after it. If so desired, this soot filter can be acted on by the fluid supplementary agent separately using a common rail injector supplied by the common rail system.

Alternatively, the device and method according to the invention can also be used exclusively for the removal of soot particles. Then the catalytic converter apparatus is no longer necessary and the supplementary agent is only injected directly into the soot or particle filter provided for this instead of into the catalytic converter apparatus.

In lieu of the catalytic converter apparatuses described, other units for aftertreating exhaust gas, which are supplied with a supplementary agent, can be connected to a valve supplied by a high-pressure device. For example, an oxidation catalytic converter can also be acted upon by a highly pressurized supplementary agent. The oxidation catalytic converter, together with the high-pressure injection, then functions as a catalytic burner, which can heat the exhaust gas, e.g. for a particle filter regeneration or for sulfur-reduction measures.

The foregoing relates to preferred exemplary embodiments of the invention, it being understood that other variants and embodiments are possible within the spirit and scope of the invention, the latter being defined by the appended claims.

We claim:

1. A method for aftertreating exhaust gases of an internal combustion engine, in which a supplementary agent for the aftertreatment is supplied to the exhaust gas flow in a metered fashion downstream of the engine, the method comprising supplying the supplementary agent in a fluid form, at a pressure of 100 to 2000 bar, wherein the supplementary agent is used to heat the exhaust gas.

2. A method for aftertreating exhaust gases of an internal combustion engine, in which a supplementary agent for the aftertreatment is supplied to the exhaust gas flow in a metered fashion downstream of the engine, the method comprising supplying the supplementary agent in a fluid form, at a pressure of 100 to 2000 bar, wherein the aftertreatment includes at least one of a catalytic reduction of nitrogen oxides contained in the exhaust gas, a removal of soot particles and a regeneration of a particle filter, and wherein the supplementary agent is used to heat the exhaust gas.

3. A device for aftertreating exhaust gases of an internal combustion engine, comprising an aftertreatment apparatus through which the exhaust gases flow, a valve (51) located downstream of the engine for the metered introduction of a supplementary agent for the aftertreatment into the exhaust gas flow, and a high pressure device (10) supplying the supplementary agent to the valve (51) in a fluid form and at a fluid pressure in a range from 100 to 2000 bar, wherein a throttle (41) is disposed between the high-pressure device (10) and the valve (51).

4. A device for aftertreating exhaust gases of an internal combustion engine, comprising an aftertreatment apparatus through which the exhaust gases flow, a valve (51) located downstream of the engine for the metered introduction of a supplementary agent for the aftertreatment into the exhaust gas flow, and a high pressure device (10) supplying the supplementary agent to the valve (51) in a fluid form and at a fluid pressure in a range from 100 to 2000 bar, wherein the supplementary agent is a fuel used in the internal combustion engine and that the high-pressure device is constituted by a common rail system (10) of the engine, and wherein a throttle (41) is disposed between the high-pressure device (10) and the valve (51).

* * * * *